(12) United States Patent
Zou et al.

(10) Patent No.: US 10,403,905 B2
(45) Date of Patent: Sep. 3, 2019

(54) STRUCTURES AND PREPARATION METHODS FOR CATALYST COATED MEMBRANES FOR FUEL CELLS

(71) Applicants: Daimler AG, Stuttgart (DE); Ford Motor Company, Dearborn, MI (US)

(72) Inventors: Yuquan Zou, Surrey (CA); Owen Thomas, Vancouver (CA); Scott McDermid, Burnaby (CA); Yunsong Yang, Surrey (GB); Jing Li, Surrey (CA); Carmen Chuy, Burnaby (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 193 days.

(21) Appl. No.: 15/375,301

(22) Filed: Dec. 12, 2016

(65) Prior Publication Data

US 2017/0179497 A1 Jun. 22, 2017

Related U.S. Application Data

(60) Provisional application No. 62/269,896, filed on Dec. 18, 2015.

(51) Int. Cl.
*H01M 4/00* (2006.01)
*H01M 4/88* (2006.01)
(Continued)

(52) U.S. Cl.
CPC ......... *H01M 4/881* (2013.01); *H01M 4/8605* (2013.01); *H01M 4/8828* (2013.01); *H01M 8/1004* (2013.01); *H01M 8/109* (2013.01); *H01M 8/1053* (2013.01); *H01M 8/1067* (2013.01); *H01M 8/1086* (2013.01); *Y02P 70/56* (2015.11)

(58) Field of Classification Search
CPC .. H01M 4/8605; H01M 4/881; H01M 8/1004; H01M 8/1067; H01M 8/1086
See application file for complete search history.

(56) References Cited

U.S. PATENT DOCUMENTS

| 5,547,551 A | 8/1996 | Bahar et al. |
| 2011/0244340 A1* | 10/2011 | Cipollini ................. H01M 4/86 429/409 |

(Continued)

FOREIGN PATENT DOCUMENTS

| EP | 1998393 A1 | 12/2008 |
| WO | 2013064640 A1 | 5/2013 |

*Primary Examiner* — Cynthia H Kelly
*Assistant Examiner* — Monique M Wills
(74) *Attorney, Agent, or Firm* — Patent Central LLC; Stephan A. Pendorf

(57) ABSTRACT

Simplified methods for preparing a catalyst coated membrane (CCM) for solid polymer electrolyte fuel cells. The CCM has two reinforcing, expanded polymer sheets and the methods involve forming the electrolyte membrane from ionomer solution during assembly of the CCM. Thus, the conventional requirement to obtain, handle, and decal transfer solid polymer sheets in CCM preparation can be omitted. Further, CCM structures with improved mechanical strength can be prepared by orienting the expanded polymer sheets such that the stronger tensile strength direction of one is orthogonal to the other. Such improved CCM structures can be fabricated using the simplified methods.

12 Claims, 11 Drawing Sheets

(51) Int. Cl.
*H01M 4/86* (2006.01)
*H01M 8/1004* (2016.01)
*H01M 8/1067* (2016.01)
*H01M 8/1086* (2016.01)
*H01M 8/1053* (2016.01)

(56) References Cited

U.S. PATENT DOCUMENTS

2013/0202986 A1\* 8/2013 Moose ................ H01M 8/1004
    429/482
2014/0261983 A1\* 9/2014 Houghtaling ....... H01M 4/8878
    156/182

\* cited by examiner

STRUCTURES AND PREPARATION METHODS FOR CATALYST COATED MEMBRANES FOR FUEL CELLS

BACKGROUND

Field of the Invention

This invention relates to simplified methods for fabricating a catalyst coated membrane (CCM) for solid polymer electrolyte membrane fuel cells. The invention further relates to CCM structures comprising reinforcement layers of expanded polymer sheets and which exhibit improved mechanical strength. The improved CCM structures can be fabricated using the simplified methods of the invention.

Description of the Related Art

A catalyst coated membrane (CCM) is a crucial component for solid polymer electrolyte fuel cells. A CCM is composed of an anode, a cathode, and a proton-conducting membrane ionomer layer (e.g. perfluorinated sulfonic acid) which serves as the electrolyte. The anode and cathode comprise appropriate catalysts and are bonded in layer form to the membrane ionomer layer. During operation of the fuel cell, the anode facilitates the conversion of fuel (such as hydrogen) to electrons and protons. The generated protons pass through the membrane ionomer layer, while electrons are forced to flow through an external circuit. Finally, protons, electrons, and oxygen react at the cathode to form water.

Among the many known methods for preparing CCMs, decal transfer methods are probably the most commonly used. In this approach, anode and cathode catalyst layers are pre-coated separately onto supporting substrates, which is then followed by a hot bonding process that laminates the two catalyst layers to the electrolyte membrane. The laminating of the catalyst layers can be done either simultaneously or sequentially. Although decal transfer methods have merits, they also have several disadvantages. First, a decal transfer step requires the use of a laminator, which adds extra cost to the processing. Second, the integrity of the membrane ionomer layer can be compromised during the hot bonding process, especially when the ionomer layer is thin (e.g. <10 μm) and the catalyst layers are rough. Third, defects such as wrinkles can be introduced in the assembly during decal transfer processes, which can significantly reduce manufacturing yield and thus increase cost.

Much effort has been devoted to address the aforementioned issues with decal transfer. For instance, direct coating of the catalyst layers onto the electrolyte membrane via various coating techniques (such as spray coating or inkjet printing) has been adopted to avoid decal transfer steps. However, the solvents (e.g. $H_2O$ and alcohol) in the typical catalyst inks significantly swell the electrolyte membrane during coating and this leads to significant cracking of the catalyst layers during subsequent drying, thereby compromising the integrity of the membrane-catalyst interface.

More recently, a new approach has emerged, which allows the direct coating of catalyst and ionomer layers on top of each other. WO2013/064640 discloses an "integral" approach to first coat the cathode layer onto a supporting substrate, followed by electrolyte membrane coating, in which an expanded polytetrafluoroethylene (ePTFE) substrate pre-impregnated with ionomer dispersion is introduced and then adhered to the cathode layer. Finally, the anode layer is coated onto the membrane ionomer layer to fowl the CCM. In this approach, only one ePTFE sheet is used for mechanical reinforcement of the CCM. No data regarding the mechanical strength and hydration stability of the CCM is disclosed. In other approaches, more than one reinforcement layer may be employed in CCM fabrication. For instance, US20130202986 discloses a fuel cell construction comprising a reinforced electrode assembly comprising first and second porous reinforcement layers.

An important requirement for commercial fuel cell stacks is long-term durability. In automotive fuel cell applications, it is typically required that stacks should be able to operate a minimum 5,000 cycle hours (equivalent to 150,000 miles of driving) in order to compete with present automotive internal combustion engines. The mechanical strength and the in-plane hydration stability (i.e. the dimensional stability of the CCM in the planar directions as a function of hydration state) of a CCM have been identified as two major factors affecting its durability. One important approach to achieve high mechanical strength and low in-plane swelling (when hydrated) in a CCM is to introduce a reinforcement layer in the middle of electrolyte membrane (e.g. as disclosed in U.S. Pat. No. 5,547,551 or EP1998393). The swelling of the ionomer layer can be constrained by the reinforcement layer. Among the possible reinforcement materials, expanded PTFE (ePTFE) has been widely used. Desirably, ePTFE can be manufactured in a continuous web which is characterized by a machine direction (MD) and a transverse direction (TD). For use as a reinforcement material in a CCM, the properties of the ePTFE should preferably be tailored to provide high in-plane mechanical strength in both the MD and the TD in order to minimize in-plane swelling in both the machine and transverse directions. In addition, the presence of an ePTFE reinforcement layer should preferably have minimal impact on proton conductivity over the electrolyte membrane and fuel cell performance generally. Unfortunately, ePTFE with preferred properties is not readily available. Most commercial ePTFE web products are anisotropic, particularly in that the mechanical strength in the machine and transverse directions are quite different. This leads to anisotropic mechanical strength in a CCM and thus greater swelling in one direction (i.e. an uneven swelling ratio between the MD and TD).

There remains a need to develop improved CCMs with balanced mechanical strength in both the machine and the transverse directions. Further, there is a need to simplify the preparation process by preferably avoiding the use of decal transfer processes. The present invention fulfills this and other needs.

SUMMARY

The present invention addresses problems of the prior art based on CCM designs having two reinforcement layers. The double reinforcement design can allow for at least three different advantages:

1) The two reinforcement layers can be located between the membrane ionomer and catalyst layers to facilitate continuous layer-by-layer coating. In the prior art, the direct coating of ionomer onto a catalyst layer can lead to the blockage of micropores in the catalyst layers and loss of fuel cell performance. In the present invention, the reinforcement layer can provide a buffer to prevent ionomer penetration into the catalyst layers. In addition, direct coating of the cathode or anode catalyst layers onto an ionomer/reinforcement layer surface does not lead to significant swelling of the surface due to the reinforcement provided by the reinforcement layer;

2) The two reinforcement layers can function as "bridging" layers to form more stable interfaces between the ionomer layer and the catalyst layers. Approximately, 95% of the reinforcement layer may be impregnated with ionomer, while 5% may be filled with catalyst ink. Such a gradually formed interface can be more resistant to interfacial de-lamination and/or the formation of catalyst cracks during fuel cell operation;

3) Better balance of mechanical strength may be achieved by orienting the two reinforcement layers such that the stronger tensile strength directions of each are orthogonal to each other. This improved mechanical strength balance between the two planar directions in a product CCM also results in more balanced in-plane swelling when hydrated.

One aspect of the invention comprises a simplified method of preparing a catalyst coated membrane assembly for a solid polymer electrolyte fuel cell. A relevant catalyst coated membrane assembly comprises a solid polymer electrolyte membrane comprising a proton-conducting membrane ionomer, first and second expanded polymer sheets bonded to opposite sides of the solid polymer electrolyte membrane, and first and second catalyst layers comprising first and second catalysts respectively and bonded to the first and second expanded polymer sheets respectively on the sides opposite the solid polymer electrolyte. In this assembly, the pores of the first expanded polymer sheet comprise membrane ionomer and first ionomer, and the pores of the second expanded polymer sheet comprise membrane ionomer and second ionomer. The method comprises the general steps of:

coating a first catalyst ink slurry comprising the first catalyst and the first ionomer onto a first supporting substrate;

applying the first expanded polymer sheet to the first catalyst ink coating;

coating a membrane ionomer solution comprising the membrane ionomer onto the first expanded polymer sheet;

applying the second expanded polymer sheet to the membrane ionomer coating;

annealing the membrane ionomer coating after the second expanded polymer sheet has been applied, thereby forming the solid polymer electrolyte membrane;

coating a second catalyst ink slurry comprising the second catalyst and the second ionomer onto the second expanded polymer sheet;

drying the first catalyst ink coating after applying the first expanded polymer sheet to the first catalyst ink coating, thereby forming the first catalyst layer; and drying the second catalyst ink coating, thereby forming the second catalyst layer.

The above steps need not be performed in the order listed above and various orderings are possible, particularly with regards to the drying steps. Further, certain steps, such as drying and annealing, may be performed concurrently.

In one embodiment, the step of drying the first catalyst ink coating may be performed before the step of coating the membrane ionomer solution. Alternatively, this step may be as part of the step of annealing the membrane ionomer coating.

In other embodiments, the step of applying the second catalyst ink slurry may comprise coating the second catalyst ink slurry onto the second expanded polymer sheet after the step of annealing the membrane ionomer coating. Alternatively, the second catalyst layer may be bonded to the second expanded polymer sheet separately first, after which it is incorporated into the rest of the CCM assembly. Here then, before applying the second expanded polymer sheet to the membrane ionomer coating, the method includes the steps of applying the second expanded polymer sheet to a second supporting substrate, coating the second catalyst ink slurry onto the second expanded polymer sheet applied to the second supporting substrate, and drying the second catalyst ink coating, thereby bonding the second expanded polymer sheet to the second catalyst layer on the second supporting substrate. Thereafter, and before annealing the membrane ionomer coating, the second expanded polymer sheet with bonded second catalyst layer is removed from the second supporting substrate, and is applied to the membrane ionomer coating.

In yet another simple embodiment, before annealing the membrane ionomer coating, the method can comprise the steps of coating the second catalyst ink slurry onto the second expanded polymer sheet, drying the second catalyst ink coating thereby forming the second catalyst layer bonded to the second expanded polymer sheet, and applying the second expanded polymer sheet with bonded second catalyst layer to the membrane ionomer coating.

Another aspect of the invention comprises yet another simplified method of preparing a catalyst coated membrane assembly for a solid polymer electrolyte fuel cell. A relevant coated membrane assembly comprises a solid polymer electrolyte membrane comprising a proton-conducting membrane ionomer, first and second expanded polymer sheets bonded to opposite sides of the solid polymer electrolyte membrane, and first and second catalyst layers comprising first and second catalysts respectively and bonded to the first and second expanded polymer sheets respectively on the sides opposite the solid polymer electrolyte. The method comprises the general steps of:

coating a membrane ionomer solution onto a first supporting substrate;

applying the first expanded polymer sheet to the membrane ionomer coating;

drying the membrane ionomer coating;

coating additional membrane ionomer solution onto the side of the first expanded polymer sheet opposite the first supporting substrate;

applying the second expanded polymer sheet to the additional membrane ionomer coating;

drying the additional membrane ionomer coating;

annealing the membrane ionomer coating and the additional membrane ionomer coating, thereby forming the solid polymer electrolyte membrane;

coating a second catalyst ink slurry comprising the second catalyst and the second ionomer onto the second expanded polymer sheet;

drying the second catalyst ink coating, thereby forming the second catalyst layer.

coating a first catalyst ink slurry comprising the first catalyst and a first ionomer onto the first expanded polymer sheet; and drying the first catalyst ink coating, thereby forming the first catalyst layer.

In this aspect of the invention, the step of coating a first catalyst ink slurry and the step of coating a second catalyst ink slurry can be performed sequentially, or alternatively these steps can be performed simultaneously.

In these methods, the first catalyst layer may be either a cathode layer or an anode layer. And thus, the second catalyst layer may also be either a cathode layer or an anode layer. The various ionomers involved, e.g. the membrane ionomer, the first ionomer and the second ionomer, may be different types of ionomer or alternatively they may all be the same type of ionomer. Suitable ionomer choices include perfluorosulfonic acid ionomer or hydrocarbon ionomer.

Another aspect of the invention comprises a CCM assembly for a solid polymer electrolyte fuel cell which is characterized by improved mechanical properties, and particularly mechanical strength. Here, the CCM assembly comprises a solid polymer electrolyte membrane comprising a proton-conducting membrane ionomer, first and second expanded polymer sheets bonded to opposite sides of the solid polymer electrolyte membrane in which each of the first and second expanded polymer sheets is a web form product having a machine direction and a transverse direction and having anisotropic tensile strength between the machine and transverse directions, and first and second catalyst layers comprising first and second catalysts respectively and bonded to the first and second expanded polymer sheets respectively on the sides opposite the solid polymer electrolyte. The CCM assembly is characterized in that the second expanded polymer sheet in the catalyst coated membrane assembly is oriented such that the stronger tensile strength direction of the second expanded polymer sheet is orthogonal to the stronger tensile strength direction of the first expanded polymer sheet.

In certain embodiments, the first and second expanded polymer sheets in the CCM assembly are expanded PTFE sheets. Typically, the machine directions in the majority of web form expanded polymer sheets are the stronger tensile strength directions. In embodiments made using such polymer sheets, the second expanded polymer sheet in the CCM assembly is oriented such that the machine direction of the second expanded polymer sheet is orthogonal to the machine direction of the first expanded polymer sheet.

However, it is possible to obtain expanded polymer sheet in which the transverse direction is the stronger tensile strength direction. Embodiments can thus be made in which the machine direction of the first expanded polymer sheet and the transverse direction of the second expanded polymer sheet are the stronger tensile strength directions. In such a case, the second expanded polymer sheet in the CCM assembly is oriented such that the machine direction of the second expanded polymer sheet is parallel to the machine direction of the first expanded polymer sheet.

An improved CCM assembly in which one of the component expanded polymer sheets is stronger in the transverse direction can be made using simple web processing methods. In general, such methods comprise the steps of:

- web coating a first catalyst ink slurry comprising the first catalyst and a first ionomer onto a first supporting substrate in web form;
- applying the first expanded polymer sheet in web form to the first catalyst ink coating;
- web coating a membrane ionomer solution comprising the membrane ionomer onto the first expanded polymer sheet;
- web coating a second catalyst ink slurry comprising the second catalyst and the second ionomer onto the second expanded polymer sheet in web form;
- applying the second catalyst ink coated, second expanded polymer sheet in web faun to the membrane ionomer coating;
- annealing the membrane ionomer coating, thereby forming the solid polymer electrolyte membrane;
- drying the first catalyst ink coating, thereby forming the first catalyst layer; and
- drying the second catalyst ink coating, thereby forming the second catalyst layer.

However, the simplified methods of the invention may also desirably be used to prepare CCMs of the invention having improved mechanical strength. For instance, in a simplified method, each of the first and second expanded polymer sheets is a web form product having a machine direction and a transverse direction, and having anisotropic tensile strength between the machine and transverse directions. The method then comprises orienting the second expanded polymer sheet in the catalyst coated membrane assembly such that the stronger tensile strength direction of the second expanded polymer sheet is orthogonal to the stronger tensile strength direction of the first expanded polymer sheet.

The methods of the invention are suitable for preparing a CCM assembly and further, these methods and the improved CCM structures of the invention are suitable for use in solid polymer electrolyte fuel cells.

Further areas of applicability of the present invention will become apparent from the detailed description provided hereinafter.

DETAILED DESCRIPTION

Figure 1:
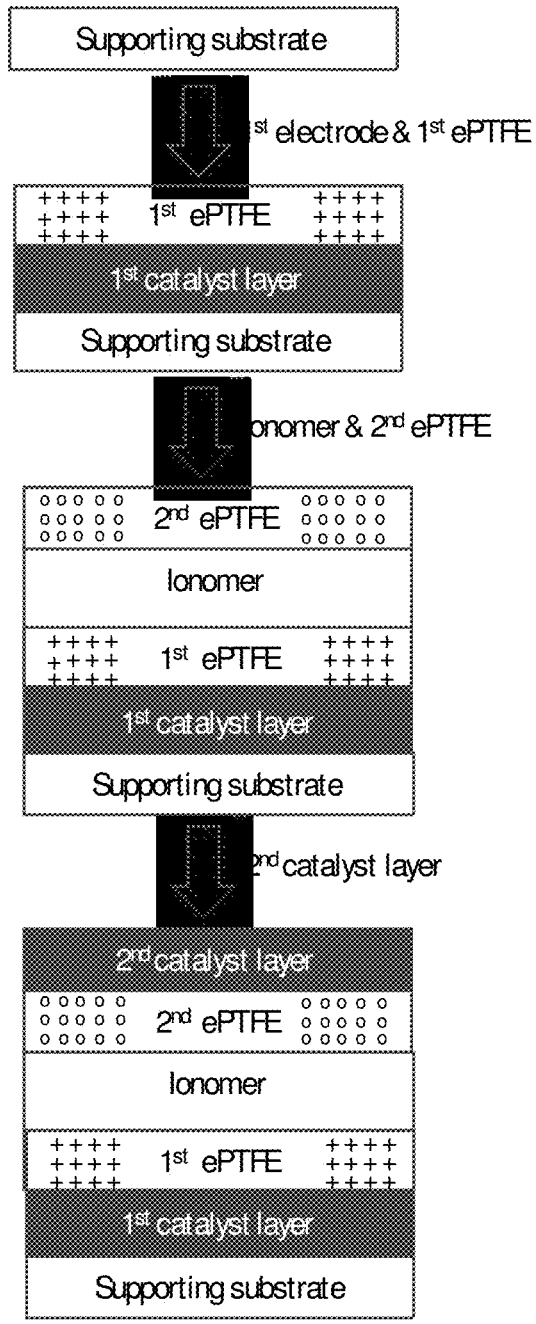
FIG. 1 shows a schematic illustration of a simplified method of the invention for preparing a CCM via a three-step sequential coating process.

Herein, in a quantitative context, the term "about" should be construed as being in the range up to plus 10% and down to minus 10%.

The "annealing" is used herein in the context of heat treating the electrolyte membrane and should be construed as heating at temperatures greater than 100° C. "Drying" can obviously be accomplished as a consequence of heating to such temperatures and thus drying can be performed as part of an annealing process. However, drying may instead be accomplished at lower temperatures, including ambient or even below ambient temperatures.

The term "anisotropic" is used herein primarily in the context of the tensile strength properties of expanded polymer sheets. Such sheets are typically produced using web processing techniques and are characterized by machine and transverse directions. Such a sheet has anisotropic mechanical properties if the tensile strength in one of the machine and transverse directions is substantially stronger than the tensile strength in the other direction.

The terms "web form product", "web coating" and the like refer to structures and methods associated with web processing and converting techniques involving the continuous processing of a moving web material from one roll to another.

In certain simplified methods of the present invention, a CCM is fabricated without using separately prepared electrolyte membrane sheets. Instead, the electrolyte membrane is formed in place during the preparation process from coated membrane ionomer solution. In this way, the substantial cost associated with obtaining separate, component ionomer membrane sheet can be avoided. Further, decal transfer steps during preparation can desirably be avoided.

An exemplary method of the invention employs a three-step sequential coating process. As shown in the schematic illustration of FIG. 1, the first catalyst layer is coated on a supporting substrate via traditional coating techniques such as blade, slot die, curtain coating, etc. Exemplary substrates include, but are not limited to, traditional fluorinated materials such as PTFE, ETFE, FEP, PFA, ECTFE, and non-fluorinated substrates such as PET coated with release agents. The first catalyst layer includes catalyst powder and at least a first proton-conductive ionomer in an appropriate ink slurry. The catalyst powders used in the present invention include, but are not limited to, Pt/carbon catalyst, Pt/metal oxide catalyst, Pt alloy/carbon, and Pt alloy/metal oxide. Other precious metals such as palladium, iridium, rhodium, and their alloys can also be readily applied. The ionomer used includes, but is not limited to, perfluorinated sulfonic acid (PFSA) or hydrocarbon type ionomers such as sulfonated polyphenylene, sulfonated poly(arylene ether sulfone), sulfonated polyimides, and sulfonated poly(ether ketone), etc. The first expanded polymer reinforcement layer is subsequently applied onto the top of the first catalyst layer while the latter is still wet. A suitable reinforcement material for use in the present invention is expanded PTFE (ePTFE). However, other porous expanded polymer sheet such as porous polypropylene (PP), porous polyvinylidene fluoride (PVDF), porous polyethersulfone (PES), and the like can be readily employed instead. The first catalyst ink coating is then dried to form the first catalyst layer. After drying, membrane ionomer solution is coated onto the first ePTFE polymer sheet, preferably via a non-contact coating method such as slot die coating to avoid damaging the ePTFE sheet. A suitable membrane ionomer for use in the current invention is Nafion D2020 (EW=950), also known as Nafion 950. However, other ionomers such as Dow type short-side chain PFSA or hydrocarbon type ionomers can be employed instead. The membrane ionomer solution impregnates the pores of the first expanded PTFE sheet. Once impregnation is completed, a second ePTFE polymer sheet layer is applied onto the membrane ionomer coating while it is still wet. The wet assembly obtained is then annealed at, for instance, 150° C. for 30 minutes to create an intermediate product known as a "half CCM" (i.e. a CCM assembly with only a single electrode layer). Finally, the second catalyst layer is coated onto the second ePTFE polymer sheet and dried (e.g. at 100° C. for 10 minutes) thereby forming a complete CCM assembly.

In FIG. 1, the first and second ePTFE polymer sheets are considered to be made of the same web faun product with anisotropic tensile strength between the machine and transverse directions. In this and subsequent figures in this application, the machine directions of the expanded polymer sheets are denoted with + hatching and the transverse directions with 0 hatching. FIG. 1 therefore shows the first and second ePTFE polymer sheets being oriented such that the second ePTFE sheet is oriented orthogonal to the first ePTFE sheet.

Figure 2:
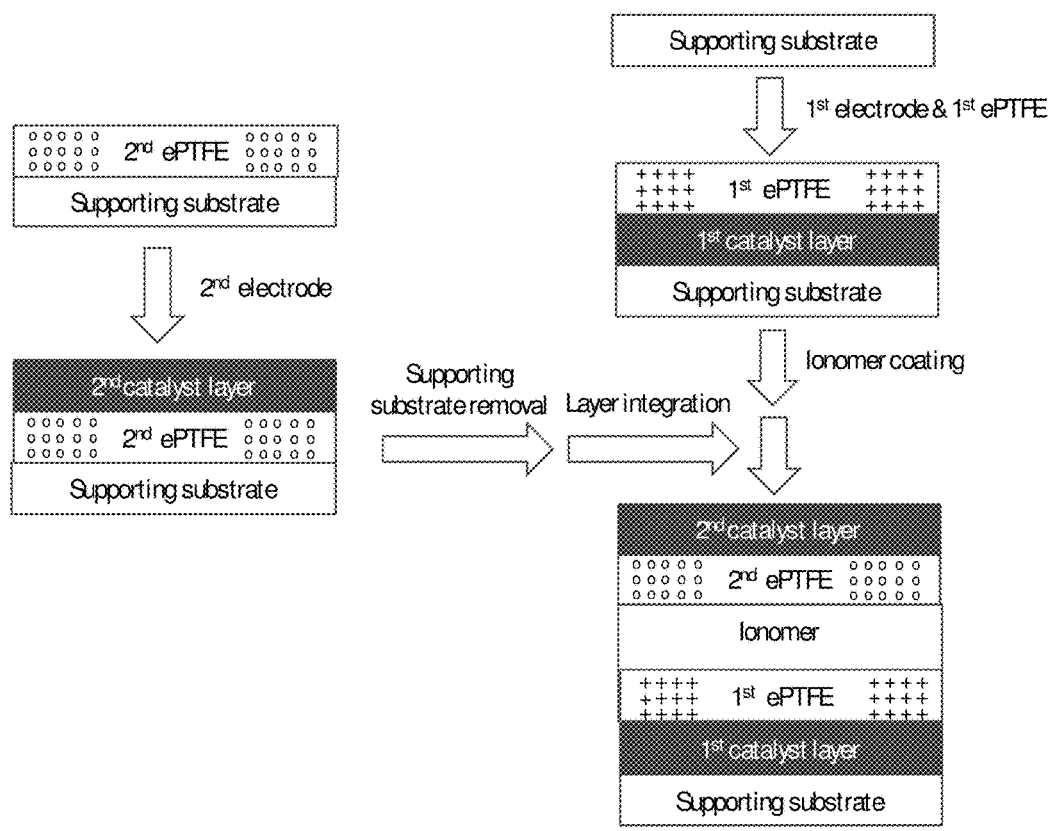
FIG. 2 shows a schematic illustration of a simplified method of the invention for preparing a CCM in which a second expanded polymer sheet is bonded to a second catalyst layer before applying the former to the membrane ionomer coating.

FIG. 2 shows a schematic illustration of an alternative exemplary method of the invention. The first catalyst layer is again coated on a substrate followed by integration with the first ePTFE polymer sheet and drying. In a like manner, but separately, the second catalyst layer is coated onto the second ePTFE polymer sheet, which is itself supported on a suitable second supporting substrate (e.g. a PET substrate). After drying of both catalyst layers, the first catalyst layer is bonded to the first ePTFE sheet and the second catalyst layer is bonded to the second ePTFE sheet. Membrane ionomer solution is then coated onto the assembly comprising the integrated first ePTFE/first catalyst/first supporting substrate. After the membrane ionomer has completely impregnated the first ePTFE polymer sheet, the second ePTFE/electrode layer is peeled off from its second supporting substrate and laid onto the membrane ionomer layer while it is still wet.

The wet assembly can then be properly annealed at 150° C. for 30 minutes, thereby completing fabrication of a CCM assembly. Use of this exemplary method can potentially simplify the winding and unwinding processes used in mass production of CCMs and improve production efficiency. As in FIG. 1, FIG. 2 shows the first and second ePTFE polymer sheets being oriented such that the second ePTFE sheet is oriented orthogonal to the first ePTFE sheet.

Figure 3:
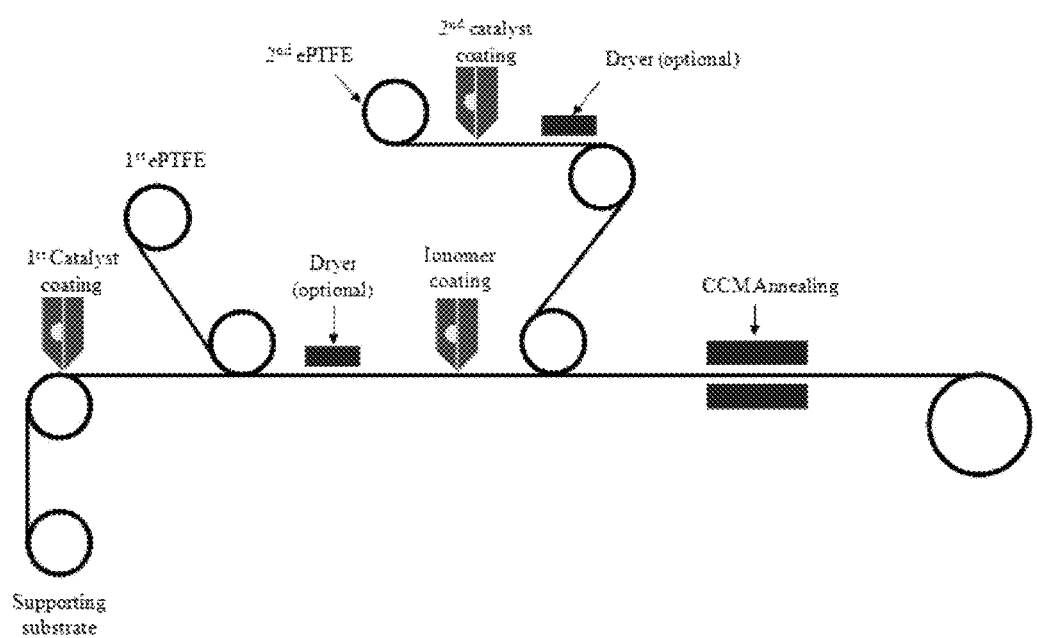
FIG. 3 shows a schematic illustration of a simplified web-based method of the invention for preparing a CCM.

FIG. 3 shows a schematic illustration of yet another exemplary method of the invention in which web processing techniques are used, and thus is particularly desirable for mass production of CCMs. Here, the first supporting substrate serves as the web upon which a CCM assembly is continuously formed. As shown, the first catalyst ink slurry is coated onto the first supporting substrate in web form. The first expanded polymer sheet is then applied from a separate supply roll to the first catalyst ink coating. Optionally before drying the first catalyst ink coating, membrane ionomer solution is coated onto the first expanded polymer sheet in the moving web. Meanwhile, second catalyst ink slurry is coated onto a moving web comprising the second expanded polymer sheet from another separate supply roll. Again, optionally before drying the second catalyst ink coating, the uncoated surface of the second expanded polymer sheet is continuously applied to the membrane ionomer coating. The wet assembly is then annealed producing a roll of CCM assembly mounted on first supporting substrate. Thus, in one option of the method illustrated in FIG. 3, the drying of both the first and second catalysts can advantageously be performed as part of the annealing step. Aside from simplifying the equipment requirement here, performing the drying and annealing steps of all the ionomer solutions at one time can result in better integration of those ionomers in the CCM product. Optionally however, the first and second catalyst ink coatings may instead be dried before coating the membrane ionomer solution and applying the second expanded polymer sheet respectively (using the optional dryers illustrated in FIG. 3).

The process shown in FIG. 3 inherently results in the machine directions of the first and second expanded polymer sheets being aligned parallel in the continuous CCM product. Thus, the depicted process does not allow for the machine direction of the second expanded polymer sheet to be oriented orthogonally to the machine direction of the first expanded polymer sheet in the product CCM. However, it is still possible to produce CCM assemblies in which the stronger tensile strength direction of the second expanded polymer sheet is oriented orthogonally to the stronger tensile direction of the first expanded polymer sheet in the product CCM. This can be achieved by using an expanded polymer web whose transverse direction has greater tensile strength than its machine direction. Such expanded polymer webs are less common but are still possible to manufacture and are available.

In the aforementioned methods, the initial coating step (namely that of coating the first catalyst ink slurry) is carried out onto a first supporting substrate in order to provide adequate support for handling and subsequent processing. In theory however, it is expected that it may be possible to coat the first catalyst ink slurry directly onto the first expanded polymer sheet if expanded polymer sheet with suitable mechanical properties can be obtained and/or if suitable handling and subsequent processing techniques for the generally weaker and more fragile expanded polymer sheet webs are identified. In this way, there may be no need for a first supporting substrate.

Figure 4:
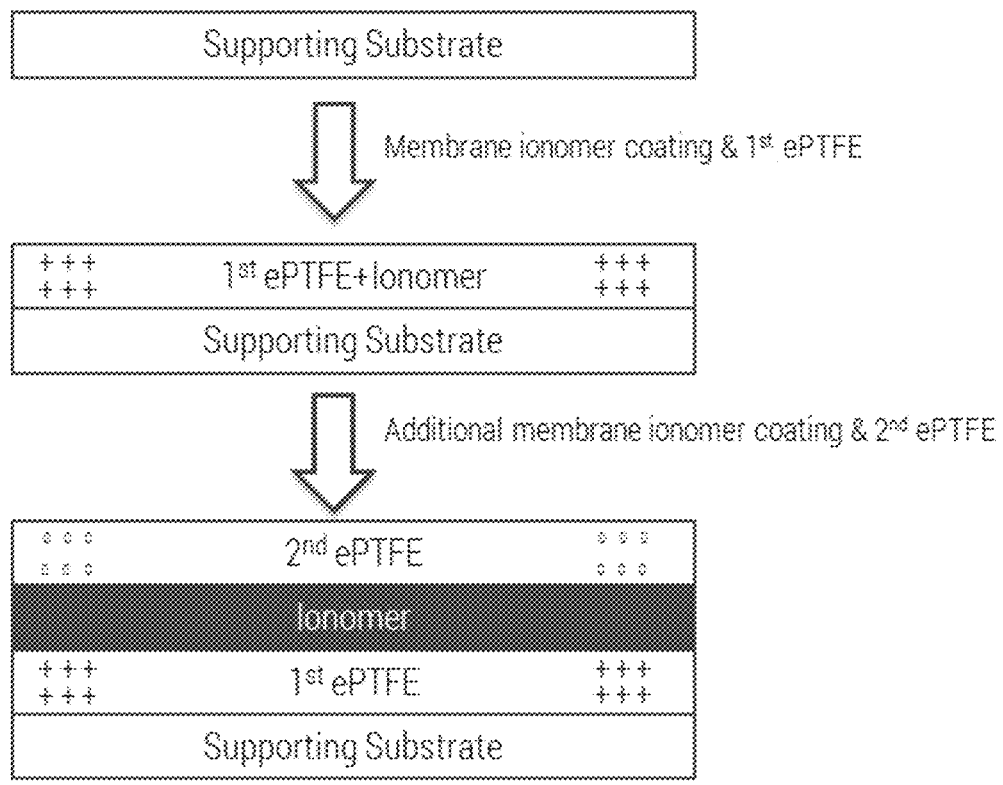
FIG. 4 shows a schematic illustration of a simplified method of the invention for preparing a double-reinforced solid polymer electrolyte membrane.
Figure 5:
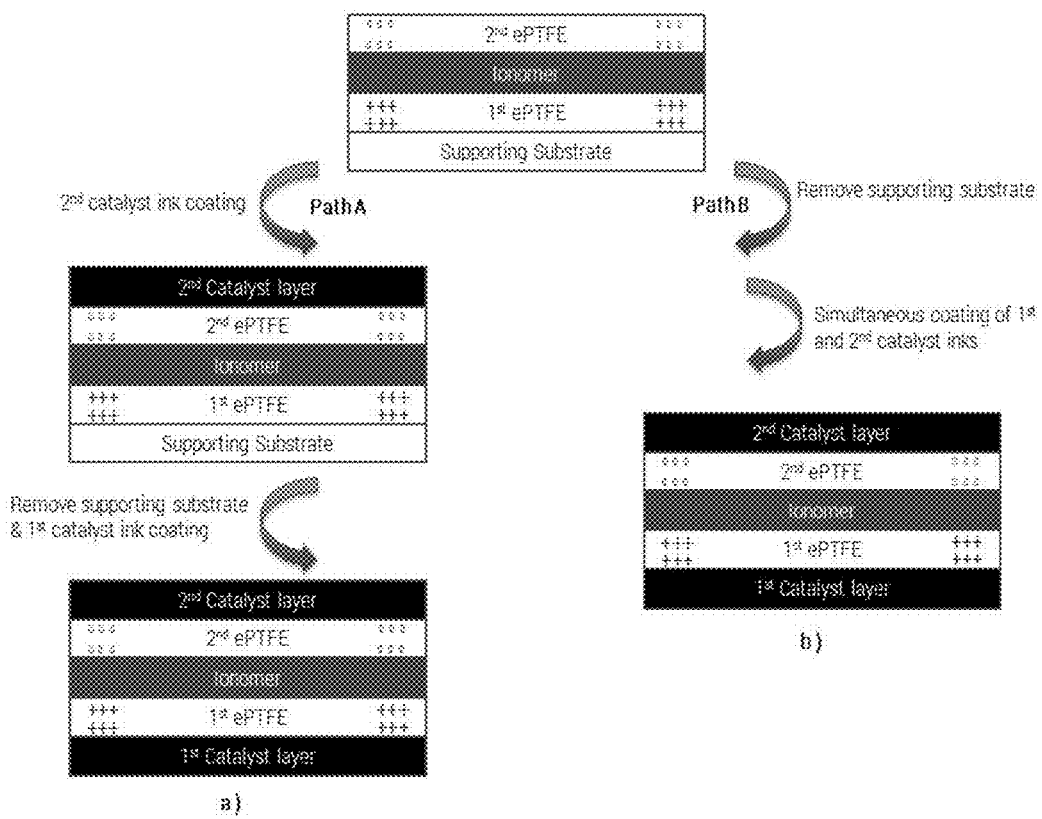
FIG. 5 shows a schematic illustration of two alternative simplified methods of the invention for preparing a CCM from the double-reinforced solid polymer electrolyte membrane of FIG. 4.

In other exemplary methods of the invention, CCMs can be prepared, without using decal transfer, as shown in the schematic illustrations of FIGS. 4 and 5. In these methods, a double-reinforced solid polymer electrolyte membrane is prepared first and then the catalyst layers are applied thereafter. For example, as shown in FIG. 4, a thin layer of membrane ionomer solution is coated onto a supporting substrate and then a first ePTFE polymer sheet is immediately wet-laminated thereto. The amount in the thin layer of membrane ionomer solution is chosen such that the dry thickness of the resulting dried ionomer is roughly equivalent to that of the first ePTFE sheet. In that way, after drying the first ePTFE sheet will be located adjacent the supporting substrate. If an excessive amount of membrane ionomer solution is used, the ePTFE sheet may float on the coated solution and thus would not be adjacent the supporting substrate after drying.

After drying, an additional layer of membrane ionomer solution is coated onto the side of the first ePTFE sheet opposite the supporting substrate. And then, a second ePTFE sheet is immediately wet-laminated thereto. The amount in the additional layer of membrane ionomer solution is chosen such that the dry thickness of the resulting dried ionomer is sufficient to create the desired membrane thickness while also filling the pores in the second ePTFE sheet.

In a like manner to the embodiment shown in FIG. 1, the first and second ePTFE polymer sheets are shown oriented such that the second ePTFE sheet is orthogonal to the first ePTFE sheet. The final assembly is then dried and annealed under appropriate conditions. The thickness of such an exemplary double-reinforced solid polymer electrolyte membrane may be about 15 μm.

FIG. 5 illustrates two different pathways for preparing a CCM using the double-reinforced solid polymer electrolyte membrane of FIG. 4. In Path A of appropriate catalyst layers are applied in two steps. Initially, the second catalyst layer is applied by coating a second catalyst ink slurry onto a second side of the double-reinforced membrane (i.e. onto the second ePTFE sheet). The coating is dried and the supporting substrate is then removed. The first catalyst layer is then applied in a like manner on to the first or opposite side of the double-reinforced membrane. It is noteworthy that having the ePTFE layers on the outer surfaces of the double-reinforced membrane is very important for minimizing swelling of the membrane when coating the catalyst layers thereon, especially when coating the first catalyst layer.

Path B of FIG. 5 shows an alternative pathway for preparing a similar CCM via a simultaneous double-sided coating of the catalyst layers. This approach requires a specially designed coater equipped with two coating heads (e.g. slot die coating head) and accurate tension control. Again, due to the presence of the outer ePTFE layers on each surface of the membrane, the membrane experiences little swelling during the coatings of the catalyst layers.

The following Examples have been included to illustrate certain aspects of the invention but should not be construed as limiting in any way.

EXAMPLES

In the following, several CCM samples were prepared in accordance with the method of the invention and the mechanical properties were compared to a conventional CCM sample prepared in a conventional manner In addition, membrane electrode assemblies (MEAs) were prepared with certain of these CCM samples and the performance of these MEAs was evaluated in experimental fuel cells.

Comparative Example 1

Catalyst Ink Slurry Preparation:
0.5 g of Pt catalyst (on carbon supports) plus 50 g of grinding media (5 mm Yttria-stablized zirconia beads) were mixed with 0.25 g of distilled and deionized water, 2 g of perfluorosulfonic acid polymer dispersion, and 5.13g of n-propyl alcohol. The ink slurry was jar milled for several days before usage.

CCM and MEA Fabrication:
A comparative CCM was made based on a decal transfer method. A catalyst ink slurry prepared as above was coated onto sheets of ETFE (ethylene tetrafluoroethylene polymer) with loadings of 0.25 mg/cm$^2$ and 0.05 mg/cm$^2$ to prepare cathode and anode electrode materials on ETFE substrates for later decal transfer. A membrane electrolyte was fabricated by coating a first layer of Nafion D2020 ionomer solution (20% solid content, n-propanol/water=60/40) onto a casted PTFE (polyethylene tetrafluoroethylene polymer) substrate (from Saint-Gobain), followed by the application of a layer of ePTFE (expanded PTFE sheet from Tetratex®, Donaldson). After quick drying, a second layer of Nafion D2020 ionomer solution was applied onto the ePTFE layer. This assembly was annealed at 150° C. for 30 minutes to produce a composite membrane electrolyte layer on the PTFE substrate. The thickness of the composite membrane electrolyte layer was about 15 μm. Anode and cathode layers were then decal transferred to opposite sides of the composite membrane electrolyte layer via hot bonding at 150° C. with an applied force of 5000 lb for 3 minutes. A MEA was prepared by assembling the comparative CCM between a pair of commercial gas diffusion layers (GDLs) from Freudenberg.

Inventive Example 1

Catalyst ink slurry was prepared in the same manner as in Comparative Example 1.

CCM and MEA Fabrication:

In this example, a CCM was fabricated according to the method illustrated in FIG. 1. Catalyst ink slurry prepared as above was coated onto a sheet of ETFE supporting substrate with a loading of 0.05 mg/cm² to serve as an anode. While the coating layer was still wet, a first sheet of ePTFE was cut from a supply roll along the machine direction (MD) and laid on the top of the wet coating layer. After drying at 55° C. for 3 minutes, a layer of Nafion D2020 ionomer solution was applied onto the first ePTFE sheet. After the ionomer solution completely impregnated the first ePTFE sheet, a second sheet of ePTFE was cut from the same roll along the transverse direction (TD) and laid on the top of applied ionomer solution while it was still wet (i.e. resulting in the MD direction of the first ePTFE being orthogonal to that of the second ePTFE sheet). After the second sheet of ePTFE was fully impregnated by the ionomer solution, the assembly was dried at ambient temperature for 1 hour, followed by annealing at 150° C. for 30 minutes. Finally, another layer of catalyst ink slurry was coated on the second ePTFE sheet with a loading of 0.25 mg/cm² to serve as a cathode. The assembly was dried at 100° C. for 10 minutes to remove the solvents to produce the CCM. The total thickness of this CCM was 25 µm while the membrane electrolyte layer therein was 15 µm.

A MEA was prepared using this CCM by cutting it down to the desired size, peeling it off from the ETFE supporting substrate, and again assembling between a pair of commercial GDLs (Freudenberg).

Inventive Example 2

A CCM was fabricated in the same manner as in Inventive Example 1, except that the second sheet of ePTFE was cut along the machine direction this time and thus the MD of the first and second ePTFE sheets were parallel in the produced CCM.

Inventive Example 3

Catalyst ink slurry was again prepared in the same manner as in Comparative Example 1.
CCM Fabrication:

In this example, a CCM was fabricated according to the method illustrated in FIG. 2. Catalyst ink slurry, again prepared as above, was coated onto a sheet of ETFE supporting substrate with a loading of 0.25 mg/cm² to serve as a cathode. While the coating layer was still wet, a first sheet of ePTFE was cut from a supply roll along the MD and laid on the top of the wet coating layer. The assembly was then dried at 55° C. for 3 minutes. A second sheet of ePTFE was then cut from the same roll along the TD and laid on a supporting PET (polyethylene terephthalate) substrate. Catalyst ink slurry was then coated onto the combined ePTFE/PET substrate with a loading of 0.05 mg/cm² to serve as an anode. The substrate was then dried at 55° C. for 3 minutes. A layer of Nation D2020 ionomer solution was coated onto the first ePTFE sheet. After the solution completely impregnated the first ePTFE sheet, the second ePTFE sheet bearing the anode layer was peeled off from the supporting PET substrate and applied onto the wet ionomer solution with the ePTFE side facing the ionomer solution. After the second sheet of ePTFE was fully impregnated by the ionomer solution, the resulting assembly was dried at ambient temperature for 1 hour, followed by annealing at 150° C. for 30 minutes. As a result of this assembly procedure, the MD direction of the first ePTFE was orthogonal to the MD direction of the second ePTFE sheet.

Figure 6:
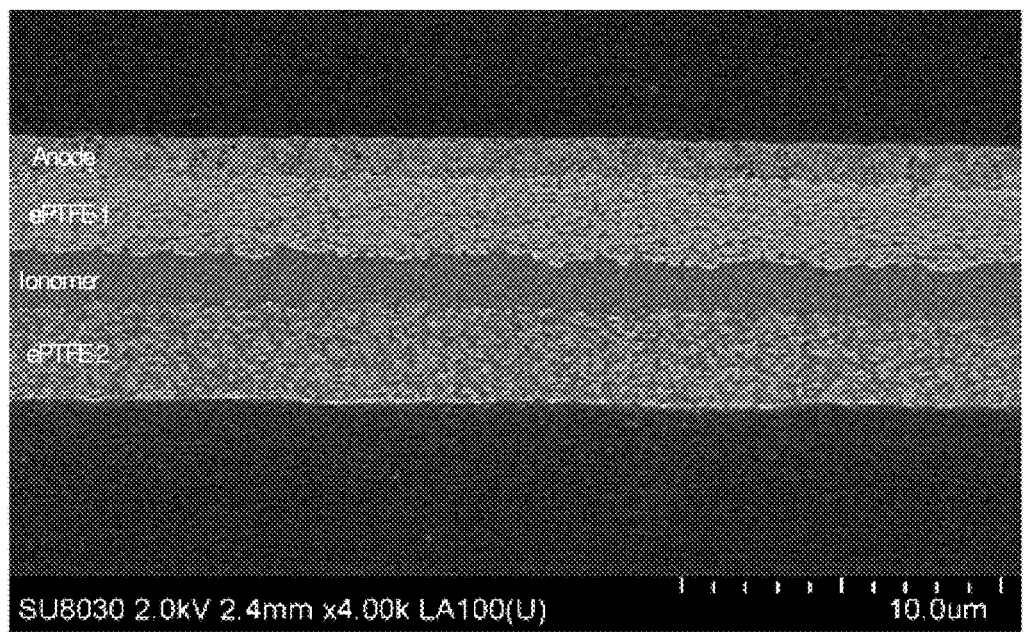
FIG. 6 shows a cross-sectional SEM image of the intermediate half CCM of Inventive Example 1.

During the fabrication of Inventive Example 1, a cross-sectional SEM image of the partially prepared, intermediate CCM was obtained prior to coating the second layer of catalyst ink slurry onto the second ePTFE sheet (i.e. prior to coating the cathode layer). FIG. 6 shows this cross-sectional SEM image of the intermediate half CCM. In FIG. 6, the first catalyst ink slurry formed the "Anode", which is seen coated on the ETFE supporting substrate. The first ePTFE polymer sheet (denoted "ePTFE-1" in FIG. 6) serves as a "bridging" layer to form an interface between the anode and the ionomer layer (denoted "Ionomer") in FIG. 6. It was observed that approximately 95% of the ePTFE-1 sheet was impregnated with ionomer, while about 5% was filled with anode catalyst (i.e. about 200 to 400 nm of the thickness). The second ePTFE polymer sheet is denoted "ePTFE-2" in FIG. 6 is also essentially filled with ionomer. Thus, ionomer is present essentially throughout both the ePTFE-1 and ePTFE-2 layers as well as the pure ionomer layer in the middle, and together these will form a reinforced membrane electrolyte in the CCM. It was noted that a continuous and uniform interface was formed between the Anode layer and the ionomer in the e-PTFE-1 layer. No lamination, bubbles, or other defects were observed throughout the intermediate half CCM sample. The thickness of the ePTFE layers and the Ionomer layer are pre-determined according to the desired CCM design. Typically, in order to achieve desirable fuel cell performance, it is preferred that the reinforced membrane electrolyte is not thicker than about 20 µm.

Figure 7:
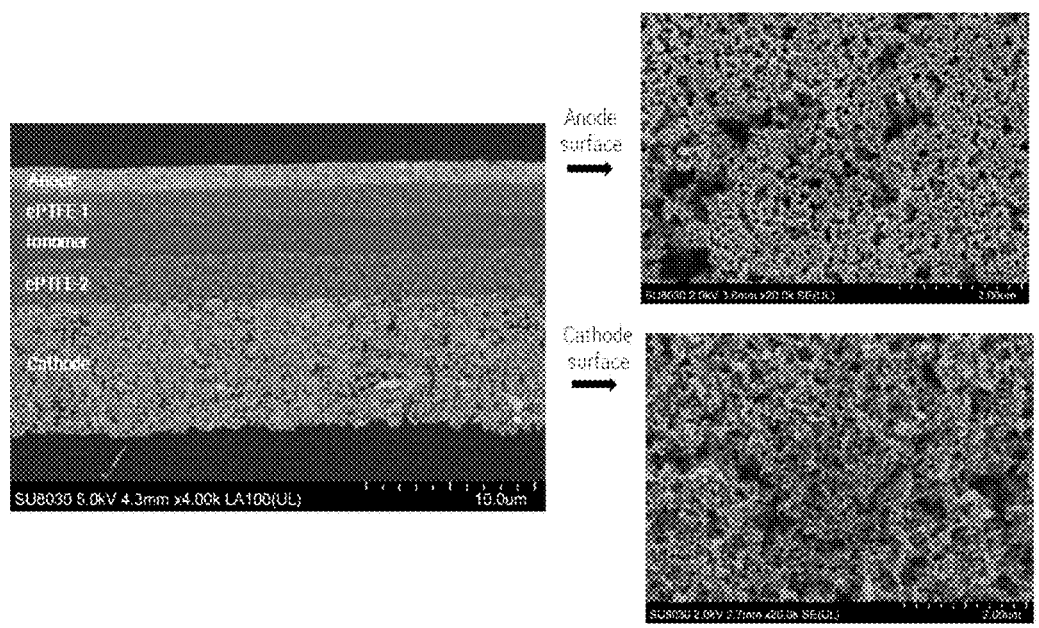
FIG. 7 shows a cross-sectional SEM image and topographical SEM images of the complete CCM assembly of Inventive Example 1.

FIG. 7 shows a cross-sectional SEM image and topographical SEM images of the complete CCM assembly of Inventive Example 1 after coating the cathode (denoted "Cathode") onto the intermediate half CCM. Due to the presence of the "ePTFE-2" layer on the surface, the cathode coating did not cause significant swelling of the interface. Thus, no noticeable cracks or delamination were observed either on the cathode/ionomer interface or within the cathode layer itself. For comparison, in the conventional preparation of CCMs without use of a reinforcing expanded polymer layer, significant cracking can be seen in the coated cathode after coating. Furthermore, the SEM images of the surface morphology of the anode and cathode show that both electrode layers remain porous. No blockage of micropores in the electrodes by ionomer was observed, which is an important requirement for maintaining mass transport within these catalyst layers.

In one aspect of the present invention, the stronger axis of each of the two reinforcing expanded polymer layers can be oriented orthogonally to one another (the purpose being to better balance the in-plane mechanical strength of the CCM). Since most commercially available expanded polymer sheet has significant anisotropy between its machine and transverse directions (e.g. significantly unbalanced in-plane mechanical strength), use of only a single layer in a CCM will result in a similar imbalance in the in-plane mechanical strength of the CCM. To demonstrate this, the mechanical strengths in both the MD and TD directions of certain CCMs above were determined using an Instron tester (tensile test). Table 1 summarizes the E-modulus and yield strengths which were determined for the Comparative Example 1 CCM (with a single ePTFE layer), the Inventive Example 1 CCM (with two orthogonal ePTFE layers), and Inventive Example 2 (with two parallel ePTFE layers).

TABLE 1

| Example CCM | E-modulus (MPa) (MD, TD) | Yield strength (MPa) (MD, TD) |
|---|---|---|
| Comparative Example 1 | 280, 400 | 12, 23 |
| Inventive Example 2 | 330, 760 | 14, 60 |
| Inventive Example 1 | 600, 620 | 40, 43 |

Figure 8:
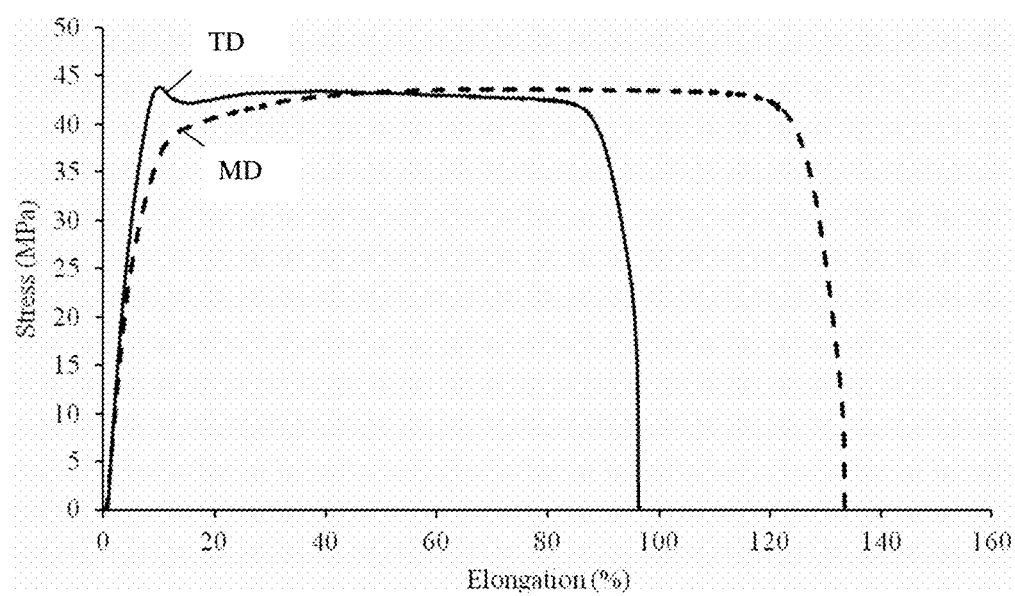
FIG. 8 shows plots of the Instron stress/strain curves for the CCM of Inventive Example 1.

As is evident from Table 1, the Comparative Example 1 CCM shows significant unbalanced mechanical strength characteristics between the MD and the TD due to the anisotropy of the ePTFE used, which has stronger mechanical strength on TD than MD. Specifically the elastic modulus and yield strength in the TD is significantly higher than that in the MD. The anisotropy between the MD and TD becomes more exaggerated for the Inventive Example 2 CCM, with the two parallel ePTFE layers, and hence their stronger axes aligned. In contrast, the Inventive Example 1 CCM shows almost identical mechanical strength in the MD and the TD, due to the orthogonal alignment of the two reinforcing ePTFE. In further support of this finding of approximate isotropy, FIG. 8 shows plots of the Instron stress/strain curves for the CCM of Inventive Example 1.

To further evaluate mechanical properties of these CCMs, the dimensional stability was determined by measuring the swelling ratio (% increase) over all 3 dimensions (i.e. machine direction, transverse direction, and the Z direction perpendicular to the plane of the CCM) after exposure to 85° C. distilled, deionized water for two hours. Table 2 shows the swelling ratios of Comparative Example 1 and of Inventive Examples 1 and 2.

TABLE 2

| Example CCM | MD (%) | TD (%) | Z (%) |
|---|---|---|---|
| Comparative Example 1 | 12 | 2 | 27 |
| Inventive Example 2 | 10 | 1 | 31 |
| Inventive Example 1 | 2 | 2 | 40 |

The Comparative Example 1 CCM and the Inventive Example 2 CCM show higher MD swelling ratios due to their weaker mechanical strength in that direction. In contrast however, the Inventive Example 1 CCM shows balanced and low swelling ratios (<5%) in both the MD and TD, which is an important characteristic for long-term mechanical durability in fuel cell applications.

Figure 9:
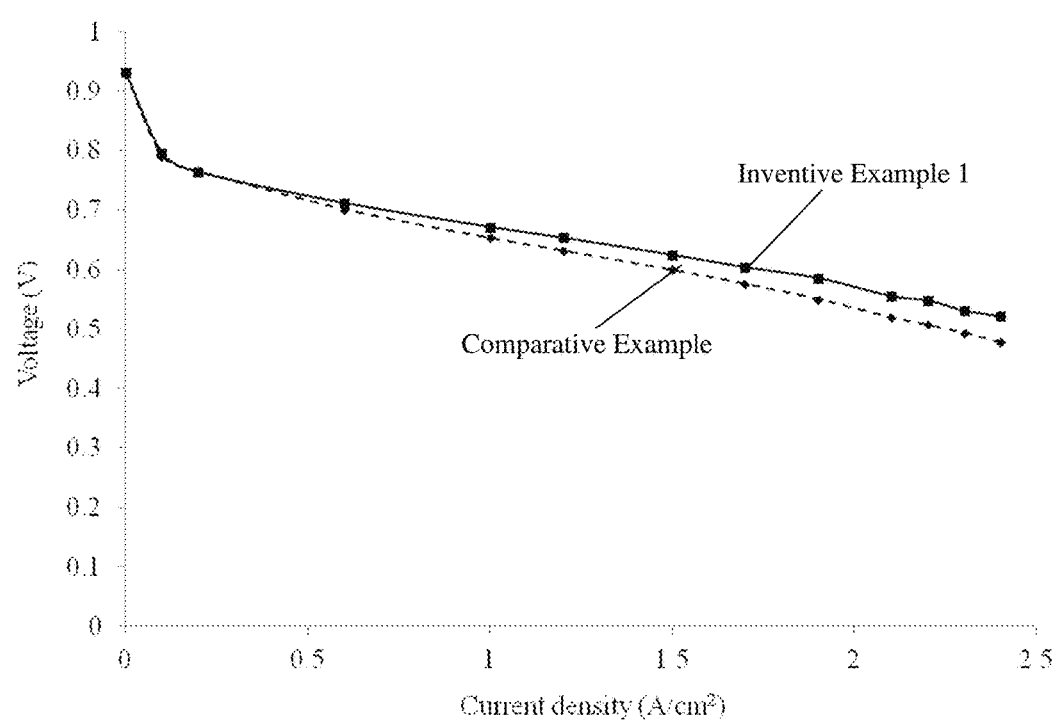
FIG. 9 compares the polarization curve (voltage versus current density) of the CCM of Comparative Example 1 to that of Inventive Example 1.

Experimental fuel cells were then made and tested using MEAs made from the Comparative Example 1 CCM and the Inventive Example 1 CCM in order to evaluate the impact of the double reinforcing ePTFE layers on fuel cell performance. After assembly and conditioning, polarization curves (i.e. voltage versus current density plots) for each fuel cell were obtained under typical operating conditions (namely using hydrogen and air reactants at 85% relative humidity and operating at 68° C.). FIG. 9 compares the polarization curves of these cells. The data suggests that the Inventive Example 1 CCM, although it contains two ePTFE layers, shows better performance than the Comparative Example 1 CCM. This might be explained by the fact that the Inventive Example 1 CCM was formed by continuous coating, which could result in a significantly lower interfacial resistance than that in a CCM prepared by decal transfer.

Comparative Example 2

Additional conventional CCM samples were prepared in order to perform additional comparison testing. Here, CCMs were made comprising commercially available DuPont NRE211 electrolyte membranes which were made into CCMs using the decal transfer methods described in Comparative Example 1. A MEA was also prepared and evaluated in an experimental fuel cell.

Inventive Example 1a

Additional inventive CCM samples were also prepared in order to perform additional comparison testing. Here, CCMs were made in a like manner to those of Inventive Example 1 except that additives for improving chemical stability were added to the Nafion D2020 ionomer. These additives are described in detail in U.S. Pat. No. 9,172,107 and/or U.S. Pat. No. 9,101,886.

Figure 10:
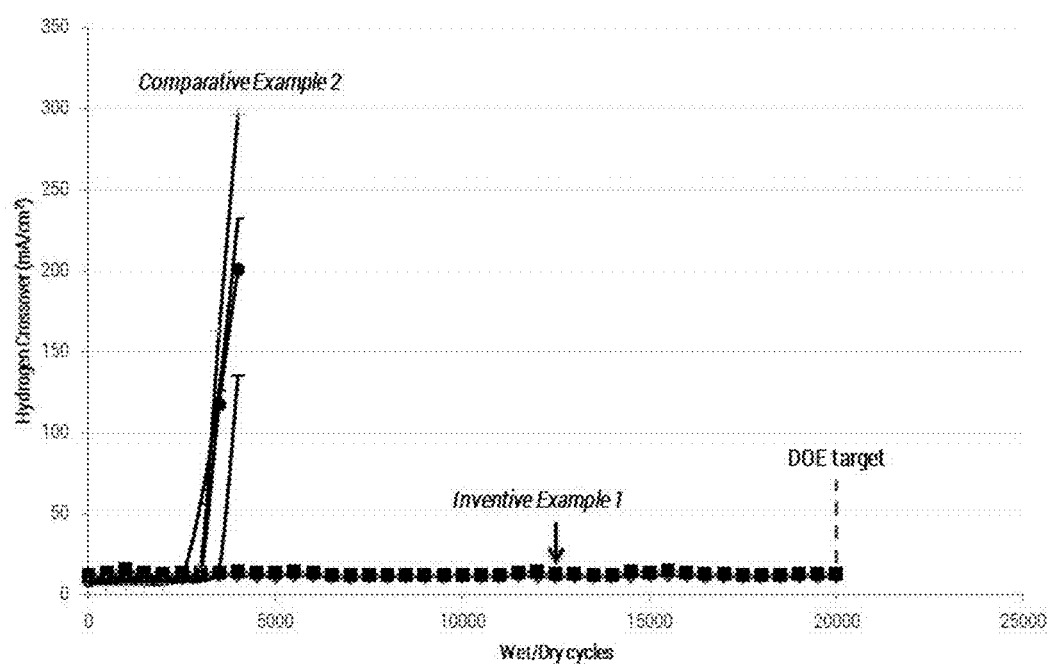
FIG. 10 compares the wet-dry cycling results of the CCM of Inventive Example 1 to that of Comparative Example 2.

MEAs comprising the CCM of Comparative Example 2 and the CCM of Inventive Example 1 were then subjected to "wet-dry cycling" testing based on a slightly modified version of a US DOE (Department of Energy) protocol. During "wet-dry cycling", the CCMs swell as they absorb water at high relative humidity (RH) and shrink as it loses water at low RH. This swelling/shrinkage cycling leads to high mechanical stress in the CCMs and subsequent mechanical failure. In this testing, nitrogen was supplied to both the anode and cathode sides and each wet-dry cycle included 1 minute under wet conditions at 150% RH and 3 minutes under dry conditions at 0% RH. The sample temperature was held at 90° C. The active area of the MEAs was ~50 cm$^2$. Hydrogen crossover through the MEAs was checked after every 500 cycles in order to monitor internal leakage. FIG. 10 compares the wet-dry cycling hydrogen crossover results of the CCM of Inventive Example 1 to that of Comparative Example 2. As shown in FIG. 10, the Comparative Example 2 CCM failed after 3000 cycles, which is slightly faster than reported in the literature (presumably due to the harsher conditions applied of higher temperature and longer time under dry condition). In contrast, the Inventive Example 1 CCM reached 20,000 wet-dry cycles (the US DOE target) without a significant measured increase in hydrogen crossover. This suggests that use of the double-reinforced electrolyte membrane of the invention can efficiently improve mechanical stability of the CCM and meet long-term mechanical durability requirements.

In further testing, experimental five-cell, fuel cell stacks were used to determine the chemical stability of similar CCM samples. In this testing, samples were evaluated under open circuit voltage (OCV) conditions at 30% relative humidity (RH) and 95□C. The supplied reactant gas flowrates were 3.5 and 11 slpm for hydrogen and air respectively. The OCV of each cell was monitored over time. In addition, the amount of fluoride released as a result of decomposition of the electrolyte layer was determined over time (i.e. the fluoride release rate) by measuring the fluoride ion found in both the cathode and anode outlet water. Testing was stopped when three cells out of five in the stack fell to an OCV of 0.8V. In this OCV testing, a stack comprising Comparative Example 2 CCMs only lasted 50 hours, but a stack comprising Inventive Example 1a CCMs (comprising the aforementioned additives) exceeded 700 hours. The improved results seen in the latter can be attributed to the beneficial stability effects from both the inclusion of the stabilizing additives and the use of double-reinforced CCMs.

Another series of tests was performed to study the effect of the presence of the double reinforcement layers on the resistance of the CCMs to electric shorting. Here, a series of breakdown voltage (BDV) tests was carried out. In the BDV tests, a piece of sample CCM (5 cm×5 cm in size) was sandwiched between two gas diffusion layers (GDLs, 4 cm×4 cm in size). The subassembly was then placed between two carbon plates (3 cm×3 cm in size) and the final assembly was compressed between two copper coated compression heads under 2.5 MPa compression force in a dry nitrogen environment. Then a controlled voltage was applied through the compression heads using a power supply. The voltage was gradually increased at a rate of 10V/min and both voltage and leakage current was recorded. A breakdown voltage was considered to be identified when the leakage current reached 2A. If a breakdown voltage was detected at a voltage lower than 3V, the sample was considered to "fail".

In this series of tests, three different GDL types from different commercial suppliers were evaluated. These are denoted here as GDL1, GDL2, and GDL3 respectively. The relative surface roughness of these GDLs was ranked as approximately being GDL1≈GDL2 <GDL3. 50 repeats of testing using Inventive Example 1 and Comparative Example 1 CCMs with each of these three GDL types were conducted.

In this BDV testing, there were 0 fails or a 0% failure rate for the Inventive Example 1 CCMs when combined with either the GDL1 or the GDL2 type GDLs. However, 6% and 4% failure rates were observed for the Comparative Example 1 CCMs when combined with the GDL1 and the GDL2 type GDLs respectively. Because the GDL3 type of GDL had a rougher surface, higher failure rates were observed in both cases. Nonetheless, the Inventive Example 1 CCMs still showed a much lower failure rate than did the Comparative Example 1 CCMs when combined with the GDL3 type of GDLs, namely 10% and 43% failure rates respectively. These results suggest that the presence of the two ePTFE reinforcement sheets in the Inventive Example 1 CCMs had significantly improved its resistance to electrical shorting.

Inventive Example 4

A double-reinforced electrolyte membrane was made according to the method illustrated schematically in FIG. 4. First, a supporting substrate of PTFE (polyethylene tetrafluoroethylene polymer from Saint-Gobain) substrate was coated with a first layer of Nafion D2020 ionomer solution (20% solids content in a solution comprising n-propanol and water, in a ratio of n-propanol/water of 60/40). While this first coating layer was still wet, a first sheet of ePTFE was cut from a supply roll along the machine direction (MD) and laid on top of the wet first ionomer layer. After a quick drying, a second layer of similar Nafion 950 ionomer solution was applied onto the first ePTFE sheet. A second sheet of ePTFE was then cut from the same roll along the transverse direction (TD) and laid on the top of applied second ionomer layer while it was still wet. (As a result, the MD direction of the first ePTFE sheet was orthogonal to that of the second ePTFE sheet). After the second sheet of ePTFE was fully impregnated by the ionomer solution, the assembly was dried at ambient temperature for 1 hour. The assembly was subsequently annealed at 150° C. for 30 minutes to produce a double-reinforced electrolyte membrane on the PTFE substrate. The thickness of the double-reinforced electrolyte membrane was about 15 μm.

CCM Fabrication:

Catalyst ink slurry was prepared in the same manner as in Comparative Example 1.

A CCM incorporating the preceding double-reinforced electrolyte membrane was then fabricated according to Path A in FIG. 5a. A second layer of catalyst ink slurry was coated onto the exposed surface of the double-reinforced electrolyte membrane obtained above with a loading of 0.25 mg/cm$^2$ to serve as a cathode. The assembly was dried at 55° C. for 10 minutes to remove the solvents. The resulting half-CCM was then peeled off from the PTFE substrate and taped onto a PET (polyethylene terephthalate) substrate with the cathode side facing towards the PET. Then a first layer of catalyst ink slurry was coated onto the exposed surface of the half-CCM with a loading of 0.05 mg/cm$^2$ to serve as an anode. The assembly was dried at 100° C. for 10 minutes to remove the solvents and thereby producing a complete CCM. The total thickness of this CCM was 25 μm, while the membrane electrolyte layer therein was 15 μm.

Figure 11:
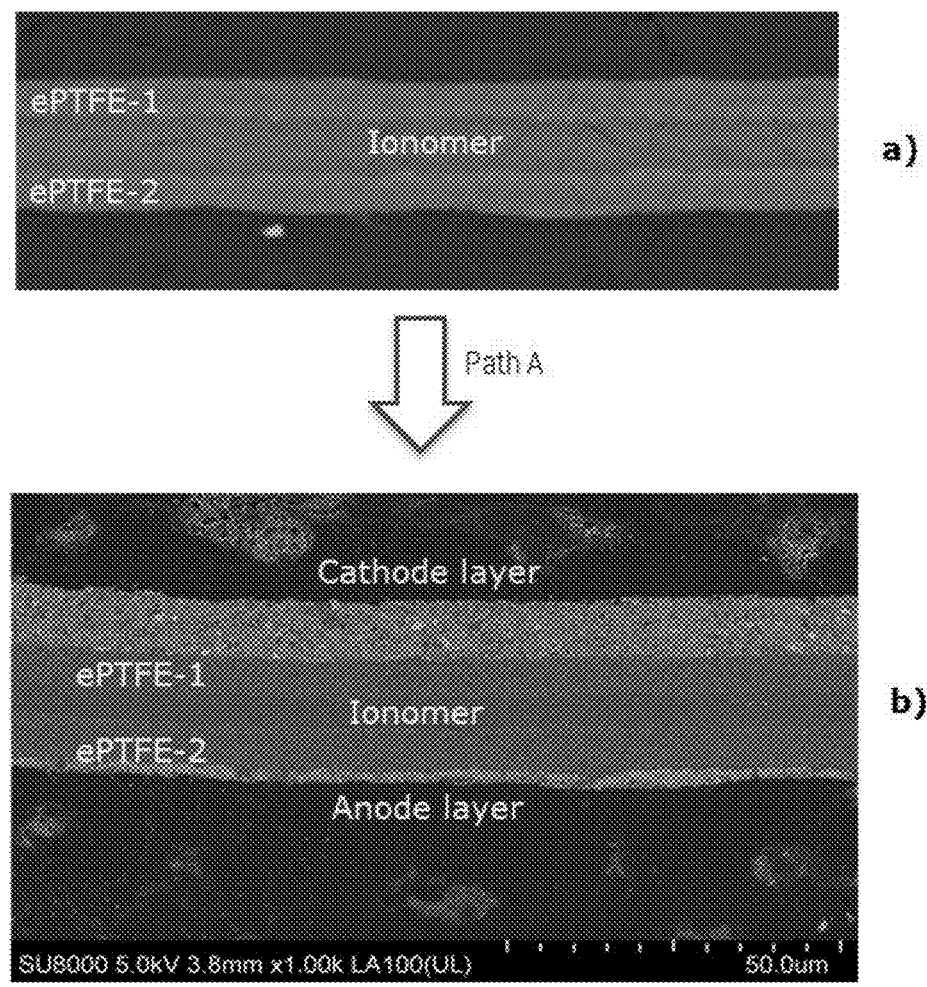
FIG. 11 shows a) a cross-sectional SEM image of the double-reinforced solid polymer electrolyte membrane and then 1$_2$) the subsequent CCM obtained in Inventive Example 4.

FIG. 11 shows a) a cross-sectional SEM images of the double-reinforced solid polymer electrolyte membrane per se and then b) the subsequent CCM that were prepared above. In FIG. 11, part a), the two ePTFE polymer sheets (denoted "ePTFE-1" and "ePTFE-2") were observed as being on the outer surfaces of the membrane, while a strictly ionomer layer was observed in the middle, in between the ePTFE sheets. Ionomer appeared to be present essentially throughout both ePTFE sheets as well as throughout the space in between the sheets, and therefore together this formed a suitable double-reinforced electrolyte membrane. In part b), the electrodes in the inventive CCM are denoted as "cathode layer" and "anode layer". Due to the presence of the ePTFE layers on the surface of the electrolyte membrane, the catalyst coatings did not cause significant swelling of the interface. Thus, no noticeable cracks or delaminations were observed either on the catalyst/ionomer interfaces or within the catalyst layers themselves.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A method of preparing a catalyst coated membrane assembly for a solid polymer electrolyte fuel cell, the catalyst coated membrane assembly comprising
   a solid polymer electrolyte membrane comprising a proton-conducting membrane ionomer,
   first and second expanded polymer sheets bonded to opposite sides of the solid polymer electrolyte membrane wherein each of the first and second expanded polymer sheets is a web form product having a machine direction and a transverse direction, and having anisotropic tensile strength between the machine and transverse directions, and
   first and second catalyst layers comprising first and second catalysts respectively and bonded to the first and second expanded polymer sheets respectively on the sides opposite the solid polymer electrolyte membrane, wherein pores of the first expanded polymer sheet comprise membrane ionomer and first ionomer, and the pores of the second expanded polymer sheet comprise membrane ionomer and second ionomer; the method comprising:
coating a first catalyst ink slurry comprising the first catalyst and the first ionomer onto a first supporting substrate;
applying the first expanded polymer sheet to the first catalyst ink coating;
coating a membrane ionomer solution comprising the membrane ionomer onto the first expanded polymer sheet;
orienting the second expanded polymer sheet such that the stronger tensile strength direction of the second expanded polymer sheet is orthogonal to the stronger tensile strength direction of the first expanded polymer sheet;
applying the so oriented second expanded polymer sheet to the membrane ionomer coating;
annealing the membrane ionomer coating after the second expanded polymer sheet has been applied, thereby forming the solid polymer electrolyte membrane;
coating a second catalyst ink slurry comprising the second catalyst and the second ionomer onto the second expanded polymer sheet;
drying the first catalyst ink coating after applying the first expanded polymer sheet to the first catalyst ink coating, thereby forming the first catalyst layer; and
drying the second catalyst ink coating, thereby forming the second catalyst layer.

2. The method of claim 1 wherein the step of drying the first catalyst ink coating is performed before the step of coating the membrane ionomer solution.

3. The method of claim 1 wherein the step of drying the first catalyst ink coating is performed as part of the step of annealing the membrane ionomer coating.

4. The method of claim 1 wherein the step of applying the second catalyst ink slurry comprises coating the second catalyst ink slurry onto the second expanded polymer sheet after the step of annealing the membrane ionomer coating.

5. The method of claim 1 comprising:
before applying the second expanded polymer sheet to the membrane ionomer coating, the steps of:
applying the second expanded polymer sheet to a second supporting substrate;
coating the second catalyst ink slurry onto the second expanded polymer sheet applied to the second supporting substrate; and
drying the second catalyst ink coating, thereby bonding the second expanded polymer sheet to the second catalyst layer on the second supporting substrate;
removing the second expanded polymer sheet with bonded second catalyst layer from the second supporting substrate; and
applying the second expanded polymer sheet with bonded second catalyst layer to the membrane ionomer coating before annealing the membrane ionomer coating.

6. The method of claim 1 comprising, before annealing the membrane ionomer coating, the steps of:
coating the second catalyst ink slurry onto the second expanded polymer sheet;
drying the second catalyst ink coating thereby forming the second catalyst layer bonded to the second expanded polymer sheet; and
applying the second expanded polymer sheet with bonded second catalyst layer to the membrane ionomer coating.

7. The method of claim 1 wherein the first catalyst layer is a cathode layer or an anode layer.

8. The method of claim 1 wherein the membrane ionomer, the first ionomer and the second ionomer are the same ionomer.

9. The method of claim 6 wherein the ionomer is perfluorosulfonic acid ionomer or hydrocarbon ionomer.

10. A solid polymer electrolyte fuel cell comprising a catalyst coated membrane assembly made according to the method of claim 1.

11. The method of claim 1 wherein the step of coating a first catalyst ink slurry and the step of coating a second catalyst ink slurry are performed sequentially.

12. The method of claim 1 wherein the step of coating a first catalyst ink slurry and the step of coating a second catalyst ink slurry are performed simultaneously.

* * * * *